(12) United States Patent
Ido et al.

(10) Patent No.: US 8,323,767 B2
(45) Date of Patent: Dec. 4, 2012

(54) HONEYCOMB STRUCTURE

(75) Inventors: Takahiko Ido, Gifu (JP); Chizuru Kasai, Gifu (JP)

(73) Assignee: Ibiden Co., Ltd., Ogaki-Shi (JP)

( * ) Notice: Subject to any disclaimer, the term of this patent is extended or adjusted under 35 U.S.C. 154(b) by 1029 days.

(21) Appl. No.: 12/246,913

(22) Filed: Oct. 7, 2008

(65) Prior Publication Data

US 2009/0247403 A1  Oct. 1, 2009

(30) Foreign Application Priority Data

Mar. 27, 2008 (WO) .................. PCT/JP2008/055977

(51) Int. Cl.
  B32B 3/12 (2006.01)
  B01J 23/04 (2006.01)
  B01J 23/40 (2006.01)
  B01J 21/10 (2006.01)
(52) U.S. Cl. ........ 428/116; 502/328; 502/330; 502/339; 502/439
(58) Field of Classification Search .................. None
  See application file for complete search history.

(56) References Cited

U.S. PATENT DOCUMENTS

| 2002/0077248 A1 | 6/2002 | Nakanishi et al. |
| 2007/0048494 A1 * | 3/2007 | Miyairi et al. ................ 428/116 |
| 2007/0077190 A1 | 4/2007 | Ohno |
| 2008/0118701 A1 | 5/2008 | Ohno et al. |
| 2008/0119355 A1 | 5/2008 | Ohno et al. |
| 2008/0176028 A1 | 7/2008 | Ohno et al. |
| 2008/0187713 A1 | 8/2008 | Ohno et al. |
| 2008/0241003 A1 | 10/2008 | Ido et al. |
| 2008/0241005 A1 | 10/2008 | Ido et al. |
| 2008/0241008 A1 | 10/2008 | Ido et al. |
| 2008/0260991 A1 | 10/2008 | Konstandopoulos et al. |

FOREIGN PATENT DOCUMENTS

| EP | 1 649 924 | 4/2006 |
| EP | 1 702 904 | 9/2006 |
| JP | S52-39709 | * 3/1977 |
| JP | 03-065306 | 3/1991 |
| JP | 06-058138 | 3/1994 |
| JP | 2002-159859 | 6/2002 |
| JP | 2003-112048 | 4/2003 |
| JP | 2003-181301 | 7/2003 |
| JP | 2007-229700 | 9/2007 |
| WO | WO 02/28803 | 4/2002 |
| WO | WO 2005/063653 | 7/2005 |

* cited by examiner

*Primary Examiner* — David Sample
(74) *Attorney, Agent, or Firm* — Ditthavong Mori & Steiner, P.C.

(57) ABSTRACT

A honeycomb structure includes at least one a honeycomb unit having a longitudinal direction. The at least one honeycomb unit includes a SOx occluding agent, inorganic particles, an inorganic binder, and partition walls extending along the longitudinal direction to define plural throughholes. A relationship $5X+30 \leq Y \leq 5X+45$ (about $1.0 \leq X \leq$ about 2.5) is satisfied, wherein a content of the SOx occluding agent in the partition walls is expressed by X (mol/L) and a porosity of the at least one honeycomb unit is expressed by Y (%).

21 Claims, 3 Drawing Sheets

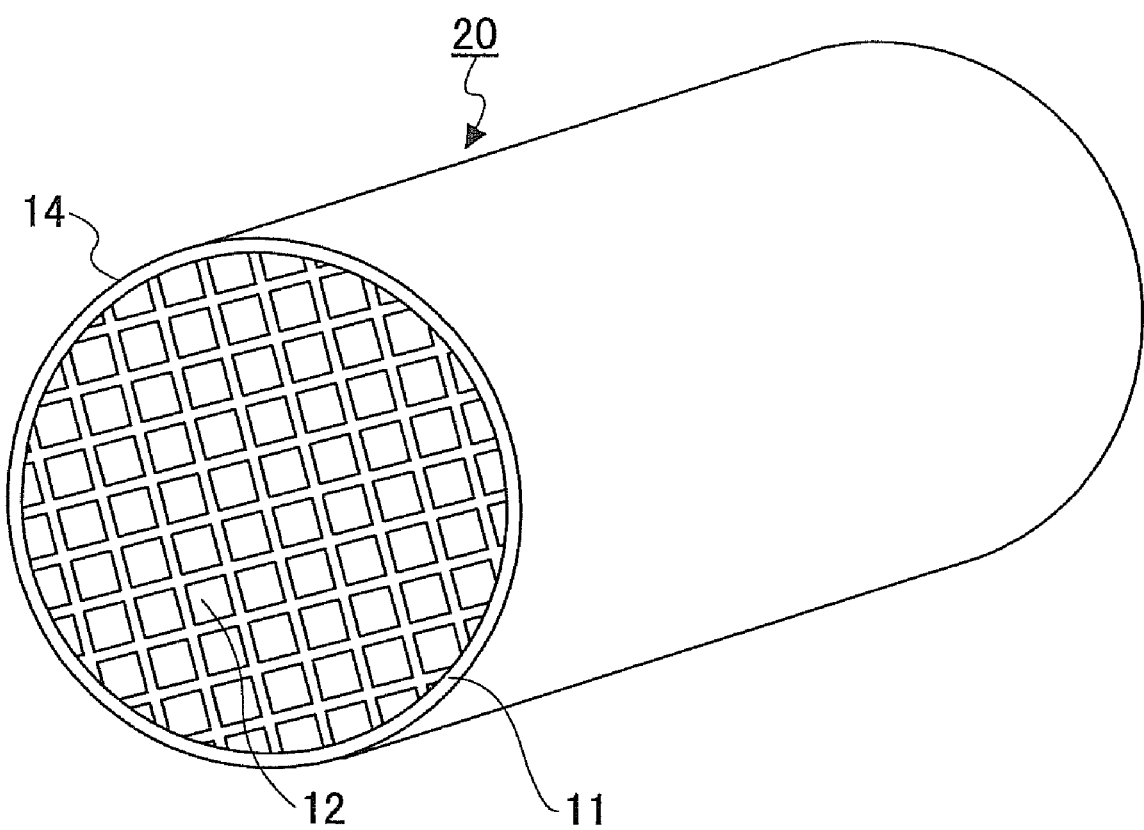

HONEYCOMB STRUCTURE

CROSS-REFERENCE TO RELATED APPLICATION

The present application claims priority under 35 U.S.C §119 to International Application No. PCT/JP2008/055977 filed on Mar. 27, 2008, the entire contents of which are incorporated by reference herein.

BACKGROUND OF THE INVENTION

1. Field of the Invention

The present invention relates to a honeycomb structure.

2. Discussion of Background

In a known honeycomb catalyst used for converting exhaust gases from automobiles, a layer made of a material having a large specific surface area such as activated alumina is formed on the surface of a honeycomb structure made of cordierite and a catalyst such as platinum is supported on the layer. Besides, in a known honeycomb catalyst used for converting exhaust gases from diesel engines, a NOx occluding agent is further supported on the layer to treat NOx in an excess oxygen atmosphere.

However, the NOx occluding agent is likely to occlude SOx more stably rather than NOx, resulting in a SOx poisoning phenomenon where the NOx occluding agent occludes Sox to thereby interfere with a proper occlusion of NOx.

In view of this, JP6-58138A discloses a sulfur capturing device that is composed of a sulfur absorbent and a casing surrounding the sulfur absorbent and arranged in an exhaust gas passage on an upstream side of the NOx occluding agent. As an example of the sulfur absorbent, at least one substance selected from alkali metals such as potassium, sodium, lithium, and cesium, alkali earths such as barium and calcium, and rare earths such as lanthanum and yttrium and a noble metal such as platinum are supported on an alumina carrier. Furthermore, a honeycomb structure as described in WO05/063653A is disclosed.

The contents of JP6-58138A and WO05/063653A are incorporated by reference herein.

SUMMARY OF THE INVENTION

According to one aspect of the present invention, a honeycomb structure includes at least one a honeycomb unit having a longitudinal direction. The at least one honeycomb unit includes a SOx occluding agent, inorganic particles, an inorganic binder, and partition walls extending along the longitudinal direction to define plural through-holes. A relationship $5X+30 \leq Y \leq 5X+45$ (about $1.0 \leq X \leq$ about 2.5) is satisfied, wherein a content of the SOx occluding agent in the partition walls is expressed by X (mol/L) and a porosity of the at least one honeycomb unit is expressed by Y (%).

BRIEF DESCRIPTION OF THE DRAWINGS

Other objects, features and advantages of the present invention will become more apparent from the following detailed description when read in conjunction with the accompanying drawings, in which:

FIG. 2 is a perspective view showing another example of the honeycomb structure according to the embodiment of the present invention.

DETAILED DESCRIPTION OF THE EMBODIMENTS

A description is given, with reference to the accompanying drawings, of an embodiment of the present invention.

Figure 1A:
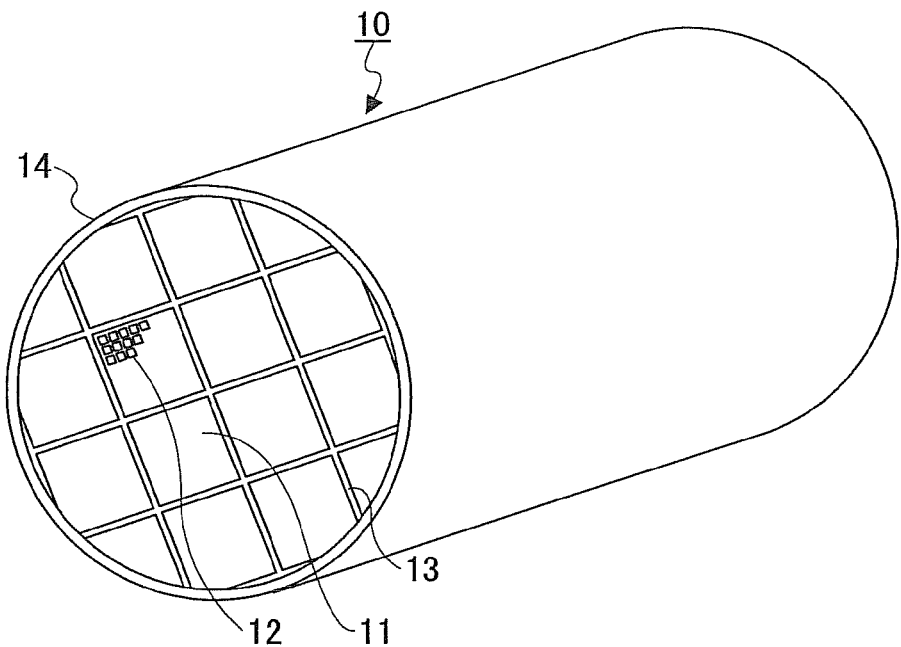
FIG. 1A is a perspective view showing an example of a honeycomb structure according to an embodiment of the present invention.
Figure 1B:
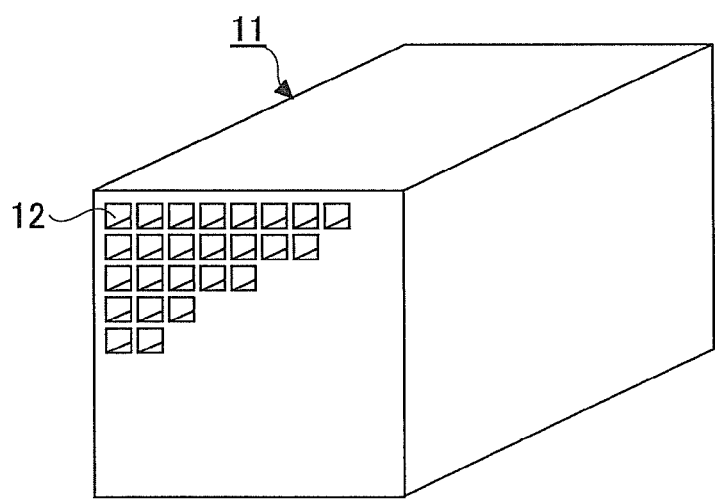
FIG. 1B is a perspective view showing a honeycomb unit in FIG. 1A.

FIGS. 1A, 1B, and 2 show an example of a honeycomb structure according to the embodiment of the present invention. In a honeycomb structure 10, plural honeycomb units 11, in which plural through-holes 12 separated by partition walls are juxtaposed in its longitudinal direction, are bonded together by interposing adhesive layers 13 and its outer surface is coated with an outer coating layer 14. Here, the honeycomb unit 11 contains a SOx occluding agent, inorganic particles, and an inorganic binder. Furthermore, when the content of the SOx occluding agent in the partition walls is expressed by X (mol/L) and the porosity of the honeycomb unit 11 is expressed by Y (%), the following relationship $5X+30 \leq Y \leq 5X+45$ (about $1.0 \leq X \leq$ about 2.5) is satisfied. Accordingly, the honeycomb structure 10 can easily reduce the stress caused when occluding SOx. Specifically, the expansion caused when the honeycomb structure 10 occludes SOx is absorbed by pores, thereby making it possible to easily relax strain. To this end, the honeycomb structure 10 is arranged on an upstream side of the honeycomb structure containing the NOx occluding agent relative to the flow of exhaust gas, thereby making it possible to easily prevent the SOx poisoning phenomenon of the NOx occluding agent.

However, when such a sulfur capturing device as described in JP6-58138A is used, a large amount of sulfur is to be absorbed. Accordingly, it is necessary to increase the size of the sulfur capturing device. In order to deal with this, it is expected to use the honeycomb structure as shown in WO05/063653A, i.e., the honeycomb structure in which porous honeycomb units that have plural through-holes and include a first inorganic material (e.g., ceramic particles), a second inorganic material (e.g., inorganic fibers and ceramic particles having a large particle diameter), and an inorganic binder are bonded together at their outer surfaces having no through-holes by interposing a sealing layer. The honeycomb structure of this kind can easily be reduced in size because it has a large specific surface area.

Nevertheless, when such a honeycomb structure is used for occluding SOx, internal stress is easily caused in the honeycomb structure possibly due to its expansion. As a result, the honeycomb structure is easily broken.

The honeycomb structure according to the embodiment of the present invention is not easily broken even if it occludes a large amount of SOx.

The SOx occluding agent is not particularly limited so long as it reacts with SOx and is capable of being occluded as a sulfate salt. Examples of the SOx occluding agent include alkali metals such as sodium and potassium and alkali earth metals such as magnesium, calcium, and barium, and they may be used in combination.

Note that the SOx occluding agent may be included in the partition walls of the honeycomb unit 11 or be supported on the partition walls. Alternatively, some part of the SOx occluding agent may be included in the partition walls, while the other part thereof may be supported on the partition walls. In this case, the SOx occluding agent included in the partition walls and that supported on the partition walls may be the same or different from each other.

In the honeycomb structure 10, the content of the SOx occluding agent in the partition walls is preferably in the range of about 1.0 through about 2.5 mol/L. If the content of the SOx occluding agent in the partition walls is greater than or equal to about 1.0 mol/L, the occlusion property of SOx can easily be kept at a sufficient level and the size of the honeycomb structure 10 can easily be reduced. On the other hand, if the content of the SOx occluding agent in the partition walls is smaller than or equal to about 2.5 mol/L, manufacturing of the honeycomb structure 10 does not easily become difficult.

The inorganic particles are not particularly limited so long as they are made of inorganic compounds other than the SOx occluding agent and capable of increasing the specific surface area of the honeycomb structure 10 to make the SOx occluding agent easily occlude SOx. Examples of the inorganic particles include alumina, titania, silica, zirconia, ceria, mullite, zeolite, etc., and they many be used in combination. Alumina is particularly preferable among them.

The average particle diameter of the inorganic particles is preferably in the range of about 0.1 through about 10 μm. If the average particle diameter is greater than or equal to about 0.1 μm, it is not necessary to add a large amount of inorganic binders. As a result, a difficulty in performing extrusion molding is not easily caused. On the other hand, if the average particle diameter is smaller than or equal to about 10 μm, the effect of increasing the specific surface area of the honeycomb structure 10 does not easily become insufficient.

In the honeycomb unit 11, the content of the inorganic particles is preferably in the range of about 30 through about 90% by weight, more preferably in the range of about 40 through about 80% by weight, and still more preferably in the range of about 50 through about 75% by weight. If the content of the inorganic particles is greater than or equal to about 30% by weight, the specific surface area of the honeycomb unit 11 is not easily reduced. On the other hand, if the content of the inorganic particles is smaller than or equal to about 90% by weight, the strength of the honeycomb unit 11 is not easily reduced.

The inorganic binder is not particularly limited. Examples of the inorganic binder include solid contents contained in alumina sol, silica sol, titania sol, water glass, sepiolite, attapulgite, etc., and they may be used in combination.

In the honeycomb unit 11, the content of the inorganic binder is preferably in the range of about 5 through about 50% by weight, more preferably in the range of about 10 through about 40% by weight, and still more preferably in the range of about 15 through about 35% by weight. If the content of the inorganic binder is greater than or equal to about 5% by weight, the strength of the honeycomb unit 11 is not easily reduced. On the other hand, if the content of the inorganic binder is smaller than or equal to about 50% by weight, molding of the honeycomb unit 11 does not easily become difficult.

Preferably, the honeycomb unit 11 further contains inorganic fibers. Accordingly, the strength of the honeycomb unit 11 can easily be improved.

The inorganic fibers are not particularly limited so long as they are capable of improving the strength of the honeycomb unit 11. Examples of the inorganic fibers include alumina, silica, silicon carbide, silica-alumina, glass, potassium titanate, aluminum borate, etc., and they may be used in combination.

The aspect ratio of the inorganic fibers is preferably in the range of about 2 through about 1000, more preferably in the range of about 5 through about 800, and still more preferably in the range of about 10 through about 500. If the aspect ratio is greater than or equal to about 2, the effect of improving the strength of the honeycomb unit 11 is not easily reduced. On the other hand, if the aspect ratio is smaller than or equal to about 1000, clogging or the like is not easily caused at the time of molding in extrusion molding, etc., or the inorganic fibers are not easily broken at the time of molding. That is, the effect of improving the strength of the honeycomb unit 11 is not easily reduced.

In the honeycomb unit 11, the content of the inorganic fibers is preferably in the range of about 3 through about 50% by weight, more preferably in the range of about 5 through about 40% by weight, and still more preferably in the range of about 8 through about 30% by weight. If the content of the inorganic fibers is greater than or equal to about 3% by weight, the effect of improving the honeycomb unit 11 is not easily reduced. On the other hand, if the content of the inorganic fibers is smaller than or equal to about 50% by weight, the specific surface area of the honeycomb unit 11 is not easily reduced.

In the honeycomb unit 11, the area of the cross section perpendicular to its longitudinal direction, i.e., the cross section perpendicular to the through-holes 12 is preferably in the range of about 5 through about 50 $cm^2$. If the area of the cross section is greater than or equal to about 5 $cm^2$, the specific surface area of the honeycomb structure is not easily reduced and the pressure loss thereof is not easily increased. On the other hand, if the area of the cross section is smaller than or equal to about 50 $cm^2$, strength against the thermal stress caused in the honeycomb unit 11 does not easily become insufficient.

The thickness of the partition walls separating the through-holes 12 of the honeycomb unit 11 is preferably in the range of about 0.05 through about 0.35 mm, more preferably in the range of about 0.10 through about 0.30 mm, and still more preferably in the range of about 0.15 through about 0.25 mm. If the thickness of the partition walls is smaller than or equal to about 0.05 mm, the strength of the honeycomb unit 11 is not easily reduced. On the other hand, if the thickness of the partition walls is smaller than or equal to about 0.35 mm, it becomes easier for exhaust gas to penetrate into the inside of the partition walls, which in turn does not easily reduce the occlusion property of SOx.

Furthermore, in the honeycomb unit 11, the number of the through-holes 12 per square centimeter in the cross section perpendicular to the longitudinal direction is preferably in the range of about 15.5 through about 186, more preferably in the range of about 46.5 through about 170.5, and still more preferably in the range of about 62.0 through about 155. If the number of the through-holes 12 per square centimeter is greater than or equal to about 15.5, the strength of the honeycomb unit 11 is not easily reduced. On the other hand, if the number of the through-holes 12 per square centimeter is smaller than or equal to about 186, the pressure loss of the honeycomb unit 11 is not easily increased.

The thickness of the adhesive layers 13 for bonding the honeycomb units 11 together is preferably in the range of about 0.5 through about 2 mm. If the thickness of the adhesive layers 13 is greater than or equal to about 0.5 mm, the adhesive strength does not easily become insufficient. On the other hand, if the thickness of the adhesive layers 13 is smaller than or equal to about 2 mm, the specific surface area of the honeycomb structure 10 is not easily reduced and the pressure loss thereof is not easily increased.

The thickness of the outer coating layer 14 is preferably in the range of about 0.1 through about 3 mm. If the thickness of the outer coating layer 14 is greater than or equal to about 0.1 mm, the effect of improving the strength of the honeycomb structure 10 does not easily become insufficient. On the other hand, if the thickness of the outer coating layer 14 is smaller than or equal to about 3 mm, the specific surface area of the honeycomb structure 10 is not easily reduced.

The honeycomb structure 10 is of a cylindrical shape, but the shape of the honeycomb structure according to the embodiment of the present invention is not particularly limited. Examples of the shape of the honeycomb structure include a rectangular pillar shape, a cylindroid shape, etc.

Furthermore, the honeycomb unit 11 is of a square pillar shape, but the shape of the honeycomb unit according to the embodiment of the present invention is not particularly limited. The shape of the honeycomb unit is preferably one making it easier to be bonded to another honeycomb unit. Examples of the shape of the honeycomb unit include a hexagonal-pillar shape, etc.

Moreover, the through-holes 12 are of a square pillar shape, but the shape of the through-holes 12 according to the embodiment of the present invention is not particularly limited. Examples of the shape of the through-holes 12 include a triangular-pillar shape, a hexagonal-pillar shape, etc.

Note that a noble metal catalyst may be supported on the partition walls of the honeycomb unit 11. The noble metal catalyst is not particularly limited so long as it is capable of oxidizing $SO_2$ to $SO_3$. Examples of the noble metal catalyst include platinum, palladium, rhodium, etc., and they may be used in combination.

Next, a description is made of an example of a method for manufacturing the honeycomb structure 10. First, molding such as extrusion molding is performed using a raw material paste containing the inorganic particles and the inorganic binder, and further containing the SOx occluding agent and the inorganic fibers as occasion demands, so as to manufacture a raw honeycomb molded body in which the plural through-holes separated by the partition walls are juxtaposed in the longitudinal direction. Accordingly, the honeycomb unit 11 having sufficient strength can easily be obtained even under a low firing temperature.

Note that the inorganic binder is added to the raw material paste as alumina sol, silica sol, titania sol, water glass, sepiolite, attapulgite, etc., and they may be used in combination.

Furthermore, an organic binder, a dispersion medium, a molding auxiliary agent, etc., may be added to the raw material paste as occasion demands.

The organic binder is not particularly limited. Examples of the organic binder include methyl cellulose, carboxymethyl cellulose, hydroxyethyl cellulose, polyethylene glycol, phenol resin, epoxy resin, etc., and they may be used in combination. Note that the addition amount of the organic binder is preferably in the range of about 1 through about 10% relative to the gross weight of the inorganic particles, the inorganic fibers, and the inorganic binder.

The dispersion medium is not particularly limited. Examples of the dispersion medium include organic solvents such as water and benzene, alcohol such as methanol, etc., and they may be used in combination.

The molding auxiliary agent is not particularly limited. Examples of the molding auxiliary agent include ethylene glycol, dextrin, fatty acid, fatty acid soap, polyalcohol, etc., and they may be used in combination.

When the raw material paste is prepared, it is preferably mixed and kneaded. The raw material paste may be mixed using a mixer, an attoritor, etc., and kneaded using a kneader, etc.

Then, the honeycomb molded body thus obtained is dried using a drying apparatus such as a microwave drying apparatus, a hot-air drying apparatus, an dielectric drying apparatus, a pressure-reduction drying apparatus, a vacuum drying apparatus, and a freeze drying apparatus.

In addition, the honeycomb molded body is degreased. Degreasing conditions are not particularly limited, and they can be appropriately selected according to the kinds and the amounts of organic matter contained in the honeycomb molded body. However, the honeycomb molded body is preferably degreased for about two hours at about 400° C.

The honeycomb molded body after being degreased is fired to obtain the honeycomb unit 11. The firing temperature is preferably in the range of about 600° C. through about 1200° C. and more preferably in the range of about 600° C. through about 1000° C. If the firing temperature is greater than or equal to about 600° C., the firing of the honeycomb molded body is easily progressed, which in turn does not easily reduce the strength of the honeycomb structure 10. On the other hand, if the firing temperature is smaller than or equal to about 1200° C., the firing of the honeycomb molded body is not excessively progressed, which in turn does not easily reduce the specific surface area of the honeycomb structure 10.

Next, after the outer surfaces of the honeycomb unit 11 are coated with a paste for an adhesive layer, plural of the honeycomb units 11 are successively bonded together and then dried for solidification to manufacture the aggregation of the honeycomb units 11. At this time, the aggregation of the honeycomb units 11 may be cut into a cylindrical shape and polished after being formed into the aggregation of the honeycomb units 11. Alternatively, in order to manufacture the aggregation of the cylindrical-shaped honeycomb units 11, the honeycomb units 11 each of whose cross section is formed into a fan shape or a square shape may be bonded together.

The paste for the adhesive layers 13 is not particularly limited. Examples of the paste for the adhesive layers 13 include a mixture of the inorganic binder and the inorganic particles, a mixture of the inorganic binder and the inorganic fibers, a mixture of the inorganic binder, the inorganic particles, and the inorganic fibers, etc.

Furthermore, the paste for the adhesive layers 13 may contain an organic binder. The organic binder is not particularly limited. Examples of the organic binder include polyvinyl alcohol, methyl cellulose, ethyl cellulose, carboxymethyl cellulose, etc., and they may be used in combination.

Then, the outer surface of the aggregation of the cylindrical-shaped honeycomb units 11 is coated with a paste for an outer coating layer 14 and dried for solidification. The paste for the outer coating layer 14 is not particularly limited, but it may contain a material the same as or different from the paste for the adhesive layers 13. Furthermore, the paste for the outer coating layer 14 may have the same composition as that of the paste for the adhesive layers 13.

Next, the aggregation of the honeycomb units 11 coated with the paste for the outer coating layer 14 is dried for solidification to obtain the honeycomb structure 10. At this time, where the organic binder is contained in the paste for the adhesive layers 13 and/or the paste for the outer coating layer 14, the honeycomb structure 10 is preferably degreased. Degreasing conditions can be appropriately selected according to the kinds and the amounts of the organic matter. However, the honeycomb structure 10 is preferably degreased for about two hours at about 70° C.

Moreover, the SOx occluding agent and/or the noble metal catalyst are/is supported on the partition walls of the honeycomb structure 10 as occasion demands. A method of supporting the SOx occluding agent and/or the noble metal catalyst is not particularly limited. Examples of the method include an impregnation method, etc.

FIG. 2 shows another example of the honeycomb structure according to the embodiment of the present invention. Note that a honeycomb structure 20 is same as the honeycomb structure 10, with the exception that it is composed of a single honeycomb unit 11 in which plural of the through-holes 12 separated by the partition walls are juxtaposed in the longitudinal direction.

The honeycomb structure according to the embodiment of the present invention may or may not have the outer coating layer.

EXAMPLES

Example 1

First, 440 g of magnesium oxide as the SOx occluding agent, 1810 g of γ-alumina having an average particle diameter of 50 μm as the inorganic particles, 680 g of alumina fibers having an average fiber diameter of 6 μm and an average fiber length of 50 μm as the inorganic fibers, 2600 g of alumina sol having a solid content of 20% by weight as a component containing the organic binder, 320 g of methyl cellulose as the organic binder are mixed and kneaded to obtain the raw material paste. Next, the raw material paste is extrusion-molded using an extrusion molding apparatus to obtain the raw honeycomb molded body. Then, the honeycomb molded body is dried using the microwave drying apparatus and the hot-air drying apparatus, followed by being degreased for two hours at 400° C. After that, the degreased honeycomb molded body is fired for two hours at 700° C. to obtain the square-pillar-shaped honeycomb unit 35 mm in length, 35 mm in width, and 68 mm in height, in which the number of the through-holes per square centimeter in the cross section perpendicular to the longitudinal direction is 93 and the thickness of the partition walls is 0.2 mm.

Subsequently, 26 parts by weight of γ-alumina having an average particle diameter of 2 μm, 37 parts by weight of alumina fibers having an average fiber diameter of 0.5 μm and an average fiber length of 15 μm, 31.5 parts by weight of alumina sol having a solid content of 20% by weight as the component containing the organic binder, 0.5 part by weight of carboxymethyl cellulose as the organic binder, and 5 parts by weight of water are mixed and kneaded to obtain the heat-resisting paste for the adhesive layer.

The paste for the adhesive layer is coated on the honeycomb unit to make the thickness of the adhesive layer 1 mm. Then, the plural honeycomb units are bonded together and dried for solidification at 120° C. to manufacture the aggregation of the honeycomb units. After that, using a diamond cutter, the aggregation of the honeycomb units are cut into a cylindrical shape to make the cross sections perpendicular to the longitudinal direction substantially symmetrical about a point. In addition, the paste for the adhesive layer is coated on the outer surface of the aggregation of the honeycomb units to make the thickness of the outer coating layer 14 0.5 mm. Then, the aggregation of the honeycomb units is dried for solidification at 120° C. using the microwave drying apparatus and the hot-air drying apparatus and degreased for two hours at 400° C. to obtain the cylindrical-shaped honeycomb structure having a diameter of 138 mm and a height of 68 mm (volume: 2 L).

After that, the honeycomb structure thus obtained is impregnated with a platinum nitrate solution and then kept for one hour at 600° C. to make 3 g/L of platinum as a noble metal catalyst supported on the honeycomb structure. Note that the honeycomb structure having platinum supported thereon contains 1.0 mol/L of magnesium oxide and has the porosity of 40%.

Example 2

The honeycomb structure having platinum supported thereon is obtained as in Example 1, with the exception that the amounts of magnesium oxide and γ-alumina used for preparing the raw material paste are 650 g and 1600 g, respectively, the average particle diameter of γ-alumina is 4 μm, and the average fiber length of alumina fibers is 80 μm. Note that the honeycomb structure having platinum supported thereon contains 1.5 mol/L of magnesium oxide and has the porosity of 46%.

Example 3

The honeycomb structure having platinum supported thereon is obtained as in Example 1, with the exception that the amounts of magnesium oxide and γ-alumina used for preparing the raw material paste are 850 g and 1400 g, respectively, the average particle diameter of γ-alumina is 4 μm, and the average fiber length of alumina fibers is 95 μm. Note that the honeycomb structure having platinum supported thereon contains 2.0 mol/L of magnesium oxide and has the porosity of 49%.

Example 4

The honeycomb structure having platinum supported thereon is obtained as in Example 1, with the exception that the amounts of magnesium oxide and γ-alumina used for preparing the raw material paste are 1070 g and 1180 g, respectively, the average particle diameter of γ-alumina is 6 μm, and the average fiber length of alumina fibers is 110 μm. Note that the honeycomb structure having platinum supported thereon contains 2.5 mol/L of magnesium oxide and has the porosity of 52%.

Comparative Example 1

The honeycomb structure having platinum supported thereon is obtained as in Example 1, with the exception that the amounts of magnesium oxide and γ-alumina used for preparing the raw material paste are 240 g and 2010 g, respectively, the average particle diameter of γ-alumina is 10 μm, and the average fiber length of alumina fibers is 120 μm. Note that the honeycomb structure having platinum supported thereon contains 0.5 mol/L of magnesium oxide and has the porosity of 55%.

Comparative Example 2

The honeycomb structure having platinum supported thereon is obtained as in Example 1, with the exception that the amounts of magnesium oxide and γ-alumina used for preparing the raw material paste are 850 g and 1400 g, respectively, the average particle diameter of γ-alumina is 2 μm, and the average fiber length of alumina fibers is 25 μm. Note that the honeycomb structure having platinum supported thereon contains 2.0 mol/L of magnesium oxide and has the porosity of 35%.

(Occlusion of Sox)

With a simulation gas at 400° C. flowing through the honeycomb structure at a space velocity (SV) of 50000/hr, the density of SOx in the gas flowing from the honeycomb structure is measured (detection limit: 0.1 ppm) using MEXA-7100D and MEXA-1170SX (manufactured by HORIBA, LTD.). At this time, the simulation gas is flowed through the honeycomb structure until the density of SOx in the gas flowing from the honeycomb structure reaches 12.5 ppm. Note that the constituents of the simulation gas are nitrogen (balance), carbon dioxide (10% by volume), oxygen (10% by volume), nitrogen monoxide (200 ppm), carbon monoxide (0% by volume), carbon hydride (200 ppm), and sulfur dioxide (125 ppm).

(Measurement of Three-Point Bending Strength)

Three-point bending strength of the square-pillar-shaped honeycomb unit before and after occluding SOx is measured using the measuring apparatus 5582 (manufactured by INSTRON, Co., Ltd.) according to JIS-R1601. Specifically, with the speed of a cross head set to 1 mm/min. and the distance (L) between spans set to 135 mm, a load is applied in the direction perpendicular to the longitudinal direction of the honeycomb unit to measure a breaking load (W). In addition, moment at the areas of the through-holes is subtracted to calculate cross-sectional secondary moment (Z), and three-point bending strength C is obtained from the formula $\sigma = WL/4Z$. Measurement results are shown in the following table 1.

The contents of JIS-R1601 are incorporated by reference herein.

|  | THREE-POINT BENDING STRENGTH[Mpa] | |
| --- | --- | --- |
|  | BEFORE SOx IS OCCLUDED | AFTER SOx IS OCCLUDED |
| EXAMPLE 1 | 7.6 | 8.2 |
| EXAMPLE 2 | 6.7 | 7.1 |
| EXAMPLE 3 | 6.5 | 7.0 |
| EXAMPLE 4 | 6.3 | 7.0 |
| COMPARATIVE EXAMPLE 1 | 3.5 | — |
| COMPARATIVE EXAMPLE 2 | 8.1 | 3.8 |

Note that in Comparative Example 1 the three-point bending strength of the honeycomb unit after occluding SOx is not measured because the three-point bending strength of the honeycomb unit before occluding SOx is small. Furthermore, the table shows that the breaking load of the honeycomb unit after occluding SOx in Comparative Example 2 becomes small.

Figure 3:
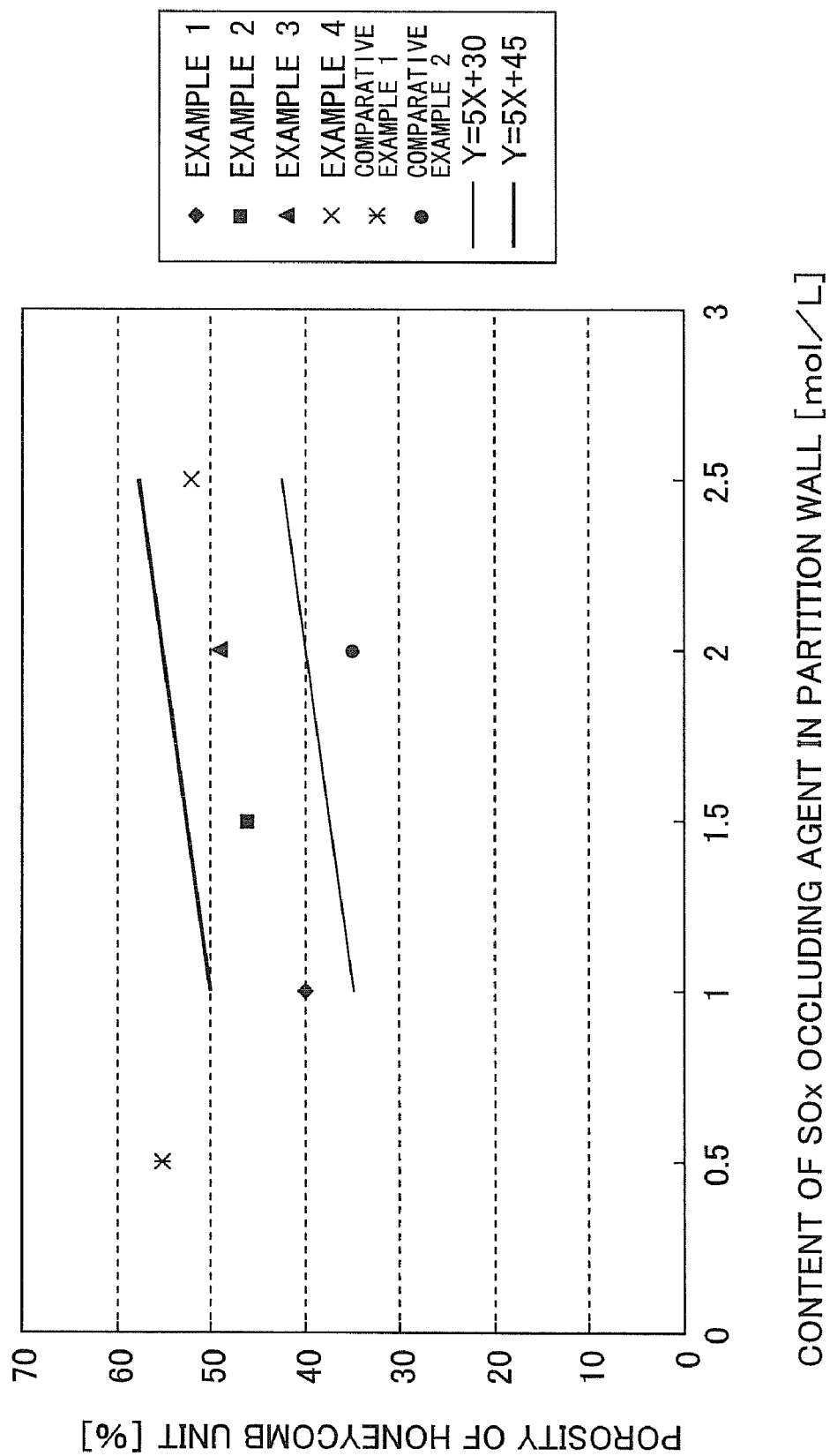
FIG. 3 is a graph showing a relationship between the porosity of the honeycomb unit and the content of a SOx occluding agent in partition walls.

Moreover, FIG. 3 shows a relationship between the porosity of the honeycomb unit and the content of the SOx occluding agent in the partition walls.

It is clear from the above that the honeycomb structure of Examples 1 through 4 satisfying the relationship $5X+30 \leq Y \leq 5X+45$ (about $1.0 \leq X \leq$ about 2.5) is not easily broken even if it occludes a large amount of SOx.

The present invention is not limited to the specifically disclosed embodiment, and variations and modifications may be made without departing from the scope of the present invention.

What is claimed is:

1. A honeycomb structure comprising:
   at least one honeycomb unit having a longitudinal direction and comprising:
   partition walls extending along the longitudinal direction to define plural through-holes;
   a SOx occluding agent;
   inorganic particles; and
   an inorganic binder,
   wherein a first relationship as follows: $5X+30 \leq Y \leq 5X+45$ is satisfied, and a second relationship as follows: about $1.0 \leq X \leq$ about 2.5 is satisfied,
   wherein X (mol/L) is a content of the SOx occluding agent in the partition walls and Y (%) is a porosity of the at least one honeycomb unit, and
   wherein, when the first and second relationships are satisfied, an effective reduction of stress caused when the honeycomb structure occludes SOx is provided.

2. The honeycomb structure according to claim 1, wherein at least a part of the SOx occluding agent is provided on the partition walls.

3. The honeycomb structure according to claim 1, wherein the SOx occluding agent contains at least one of an alkali metal and an alkali earth metal.

4. The honeycomb structure according to claim 3, wherein the SOx occluding agent contains at least one of sodium, potassium, magnesium, calcium, and barium.

5. The honeycomb structure according to claim 1, wherein the inorganic particles comprise at least one of alumina, titania, silica, zirconia, ceria, mullite, and zeolite.

6. The honeycomb structure according to claim 1, wherein an average particle diameter of the inorganic particles is at least about 0.1 μm and at most about 10 μm.

7. The honeycomb structure according to claim 1, wherein a content of the inorganic particles is at least about 30% by weight and at most about 90% by weight.

8. The honeycomb structure according to claim 1, wherein the inorganic binder is a solid content contained in at least one of alumina sol, silica sol, titania sol, water glass, sepiolite, and attapulgite.

9. The honeycomb structure according to claim 1, wherein a content of the inorganic binder is at least about 5% by weight and at most about 50% by weight.

10. The honeycomb structure according to claim 1, wherein the at least one honeycomb unit further contains inorganic fibers.

11. The honeycomb structure according to claim 10, wherein the inorganic fibers are at least one of alumina, silica, silicon carbide, silica-alumina, glass, potassium titanate, and aluminum borate.

12. The honeycomb structure according to claim 10, wherein an aspect ratio of the inorganic fibers is at least about 2 and at most about 1000.

13. The honeycomb structure according to claim 10, wherein a content of the inorganic fibers is at least about 3% by weight and at most about 50% by weight.

14. The honeycomb structure according to claim 1, wherein the at least one honeycomb unit comprises plural of the honeycomb units which are bonded together by interposing an adhesive layer.

15. The honeycomb structure according to claim 14, wherein an area of a cross section perpendicular to the longitudinal direction is at least about 5 cm$^2$ and at most about 50 cm$^2$.

16. The honeycomb structure according to claim 1, wherein a thickness of the partition walls is at least about 0.05 and at most about 0.35 mm.

17. The honeycomb structure according to claim 1, wherein
   a number of the through-holes per square centimeter in a cross section perpendicular to the longitudinal direction is at least about 15.5 and at most about 186.

18. The honeycomb structure according to claim 1, further comprising:
   an outer coating layer coated on an outer surface of the honeycomb structure.

19. The honeycomb structure according to claim 1, further comprising:
   a noble metal catalyst provided on the partition walls.

20. The honeycomb structure according to claim 19, wherein
   the noble metal catalyst comprises at least one of platinum, palladium, and rhodium.

21. The honeycomb structure according to claim 1, wherein, when the first and second expressions are satisfied, the honeycomb structure has an increased bending strength after SOx is occluded.

* * * * *